United States Patent [19]
Kresak

[11] Patent Number: 5,354,194
[45] Date of Patent: Oct. 11, 1994

[54] HIGH SPEED MOLDED PRODUCT RETRIEVAL DEVICE

[75] Inventor: Paul F. Kresak, Newmarket, Canada

[73] Assignee: Husky Injection Molding Systems Ltd., Ontario, Canada

[21] Appl. No.: 10,155

[22] Filed: Jan. 28, 1993

[51] Int. Cl.⁵ .................................... B29C 45/42
[52] U.S. Cl. ........................ 425/436 R; 264/335; 425/437; 425/444; 425/556
[58] Field of Search .......... 425/436 R, 436 RM, 437, 425/438, 444, 556, 554, 537; 264/335

[56] References Cited
U.S. PATENT DOCUMENTS 3,761,210  9/1973  Vaughan .................. 425/436 R X
3,827,856  8/1974  Van De Walker et al. ..... 425/436 R X
4,204,824  5/1980  Paradis ..................... 425/436 R
4,243,364  1/1981  Rees et al. ................ 425/436 R X
4,449,914  5/1984  Schmidts et al. ............ 425/444 X
4,732,554  3/1988  Hellmann ................... 425/444 X
4,787,841  11/1988 Simon ...................... 425/436 R X
4,814,134  3/1989  Brown ..................... 264/335 X
5,234,328  8/1993  Willson et al. ............. 425/556 X

*Primary Examiner*—Richard L. Chiesa
*Attorney, Agent, or Firm*—Bachman & LaPointe

[57] ABSTRACT

A high speed, light weight molded article retrieval device for an injection molding machine having a reciprocating trolley.

19 Claims, 7 Drawing Sheets

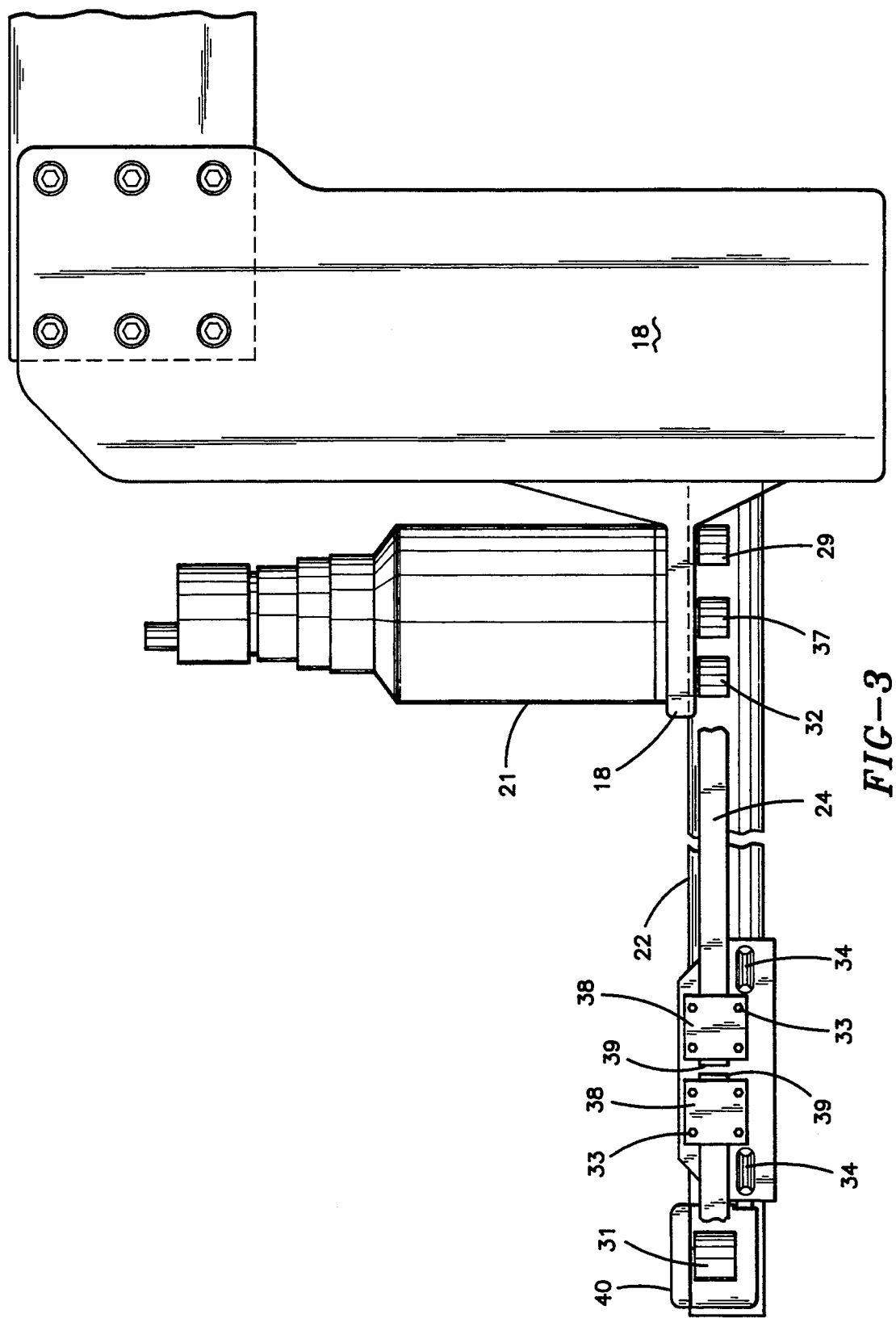

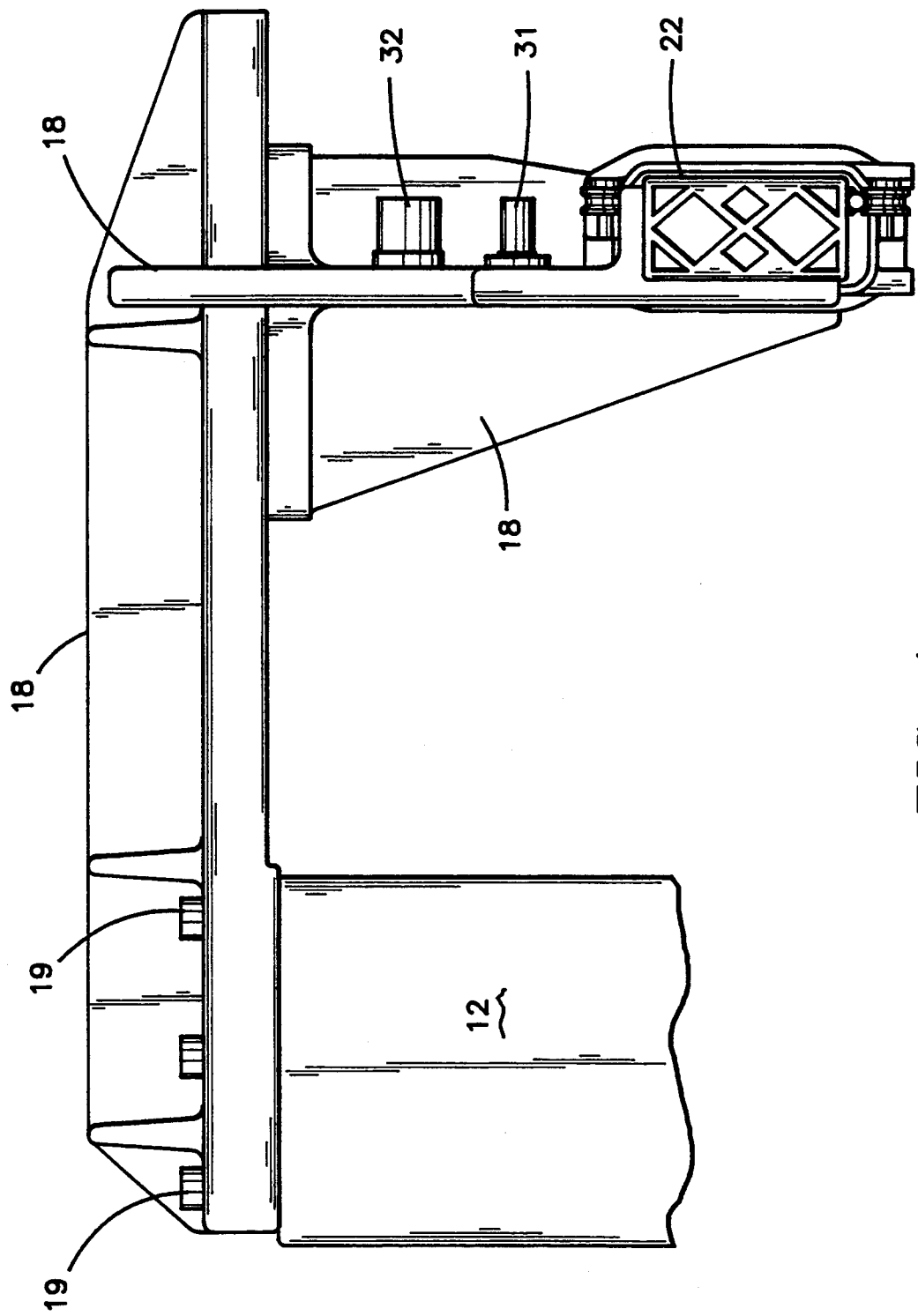

| PAY LOAD (LBS) | | 6.5 | 12 | 17 | 23.5 | 27.5 |
|---|---|---|---|---|---|---|
| MOVING WEIGHT (KG) | | 12.01815 | 14.51248 | 16.78005 | 19.7279 | 21.54196 |
| ACCEL. (G'S) | | 8.7 | 8 | 7.3 | 6.7 | 6.3 |
| ACCEL. (MM/SEC SQ.) | | 85598 | 78740 | 71577.2 | 65608.2 | 62001.4 |
| ACCEL. DIST. (MM) | | 363.22 | 396.24 | 431.8 | 472.44 | 500.38 |
| ACCEL. TIME (SEC) | | 0.092 | 0.1 | 0.11 | 0.12 | 0.127 |
| | | | | | | |
| MOVE TIME ONE WAY: | | TIME (SEC) | TIME (SEC) | TIME (SEC) | TIME (SEC) | TIME (SEC) |
| | | | | | | |
| | PAY LOAD | 3 KG | 5.5 KG | 8 KG | 10.5 KG | 12.5 KG |
| DISTANCE (MM) | | | | | | |
| 300 | | 0.143402 | 0.148451 | 0.154480 | 0.160242 | 0.164120 |
| 450 | | 0.170012 | 0.176195 | 0.183580 | 0.190637 | 0.195387 |
| 600 | | 0.192446 | 0.199585 | 0.208113 | 0.216261 | 0.221746 |
| 750 | | 0.212210 | 0.220192 | 0.229726 | 0.238836 | 0.244968 |
| 900 | | 0.231042 | 0.238655 | 0.249623 | 0.259300 | 0.265963 |
| 1050 | | 0.250092 | 0.257705 | 0.268673 | 0.278350 | 0.285253 |
| 1200 | | 0.269142 | 0.276755 | 0.287723 | 0.297400 | 0.304304 |
| 1350 | | 0.288192 | 0.295805 | 0.306773 | 0.316450 | 0.323354 |
| 1500 | | 0.307242 | 0.314855 | 0.325823 | 0.335500 | 0.342404 |
| 1650 | | 0.326292 | 0.333905 | 0.344873 | 0.354550 | 0.361454 |
| 1800 | | 0.345342 | 0.352955 | 0.363923 | 0.373600 | 0.380504 |

*FIG-7*

HIGH SPEED MOLDED PRODUCT RETRIEVAL DEVICE

BACKGROUND OF THE INVENTION

The present invention relates to injection molding machines and relates in particular to product retrieval from continuously operating, single or multi-cavity molding machines.

The prior art is replete with various methods and devices (robots) for entering an open mold to pick up molded articles in synchronism with a continuous molding cycle.

Most of the prior art units are massive. Therefore, they are difficult to accelerate and decelerate as the units reciprocate to and from into and out of the mold.

The time required for the robot to enter and exit from the mold area directly effects cycle time since the injection molding machine is "waiting" for the robot to clear the area so the molding cycle can continue. Therefore, faster part removal devices offer significant advantages relative to increase productivity.

It is necessary to maintain accurate registration between the article retrieval head and the pattern of the mold so that when the transfer of molded product from the mold to the retrieval unit occurs each individual molded article is "picked-up" cleanly without distortion and each cavity is emptied.

Vibration of retrieval units frequently results in failure to pick the mold clean or in distortion or mutilation of some of the molded articles.

Furthermore in massive retrieval units it is difficult to operate the units as high speeds in synchronism with molding operations.

Efforts to operate massive retrieval units at high speeds tends to accentuate the vibration problem which is caused by inadequate stiffness relative to the mass of the unit. Therefore, frequently it is necessary to introduce a dwell period at the end of a stroke to permit damping of the vibrations.

The time required for a robot to travel from one point to another is largely dependent on how quickly the robot can reach its maximum velocity and how quickly it can stop; in other words how fast it can accelerate and decelerate. An undesirable consequence of accelerating too quickly is that it can create or accentuate vibration resulting in inaccurate positioning relative to the mold. Acceleration and deceleration requires the input or removal of energy from the unit in terms of a force acting on the components that need to be moved. The greater the mass that must be moved, the greater the forces and therefore, energy that is involved. These forces must be dealt with and it is the reaction of these forces acting to deform the bodies that result in vibration. The stiffness of the components determines the resulting displacement associated with the energy (forces) causing the vibration.

Vibration has normally been reduced by making components larger (in order to make them stiffer) so that the vibrations result in smaller movements relative to the mold. This, in turn, adds to the vibration problem since more mass now needs to be moved. The ideal situation is one where there are very stiff components that have very little mass and it is the objective of this invention to meet this criteria. Light (small mass) components and assemblies can be accelerated very quickly without inducing any substantial vibration because they have relatively low inertia.

Inertia can be defined as the property of a body that maintains it in the state of rest or motion until acted on by some force with its mass being a measure of inertia.

Momentum is defined as the property of a moving body that determines the length of time required to bring it to rest when under the action of a constant force and is expressed mathematically as the product of mass and velocity for a body moving in a linear motion in given direction. Changing either the mass, direction or velocity will change the momentum.

SUMMARY OF THE INVENTION

From the above, one can see that in order to cause a body to move a certain speed (velocity), reducing the body's mass while maintaining its stiffness, will reduce the forces required which will, in turn, reduce the deformations and consequently the vibrations. The present invention features relatively stiff components for their mass. This allows a carriage with an article pick up plate to be accelerated and decelerated very quickly (observed up to 8.7 g's with a 3 kg payload) with substantially lower forces. The structure possesses the rigidity or stiffness required to minimize vibration caused by deflection from the forces acting on it.

The present invention is particularly well suited as a side entry robot because of its substantially high stiffness.

Another feature of the present invention is that the device can carry a substantially higher payload (12.5 kg has been demonstrated) at a substantially high maximum speed of 7.8 m/s with accelerations of up to 8.7 g's. This combination of capabilities is unique for a side entry robot. FIGS. 7 and 8 show the performance of the invention as applied to various payloads and travel distances. For example, the invention is able to move a 12.5 kg payload horizontally 1.8 meters in 0.38 seconds from start to rest.

Another advantage of the instant invention is that for a given cycle of the part retrieval device, less energy will be required than prior art devices since substantially less mass needs to be moved.

Consequently it is a primary feature of the present invention to provide an improved product retrieval unit or robot for operation with a single or multi-cavity mold.

A further feature of the invention is the provision of a light weight boom, beam or arm structure suitable for attachment directly to (a) the frame of a molding machine, (b) a fixed mold platen, (c) a movable mold platen or to any other convenient location allowing ease of removal.

A further feature of the invention is that the boom provides a track upon which a light weight product retrieval means travels in the manner of a carriage or a trolley moving into and out of an open mold in synchronism with the molding cycle.

A further feature of the invention is the provision of a boom fabricated of light weight, high strength materials such as aluminum, titanium, or magnesium, or alloys thereof including, plastics, fiberglass reinforced plastics or composites or laminates of such metals and plastics.

A further feature of the present invention is the provision of a light weight boom structure with sufficient rigidity to exhibit little or no vibration when attached to a movable mold platen of an injection molding machine.

A still further feature of the invention is the provision of a light weight take out plate or retrieval unit carried by a trolley means where the trolley means traverses a fixed boom means in cyclic fashion and in synchronism with the molding cycle.

The style and structure of the pick up plate is not critical so long as payloads (weight of pick up plate plus weight of article or articles retrieved) range from 1 kg to 15 kg.

A classic pick up plate includes a plurality of vacuum cups, one for each article retrieved.

A further feature of the present invention is the provision of power means for driving the trolley means to and fro along the boom means at peak speeds reaching 7.8 meters per seconds at accelerations as high as 85 meters per second per second or 8.7 g.

A further feature of the invention is the provision of a trolley means fabricated of high strength, light weight materials such as aluminum, titanium, magnesium or alloys thereof including plastics, fiberglass reinforced plastics or composites or laminates of such metals and plastics where the weight of the trolley means, exclusive of the pick up plate, of the order of 8 to 10 kg.

A further feature of the invention is the provision of the trolley means which at least partially encircles the boom means.

A further feature of the invention is the provision of at least one roller for supporting and guiding the trolley means as the roller engages and rolls along the boom means.

It is a still further feature of the invention to provide power means including belt means connected to the trolley means for moving the trolley means into and out of an open mold.

A further feature of the invention is the provision of control means for synchronizing the operation of the injection molding cycle with the operation of the trolley means.

A high speed article retrieval device or robot for unloading molded product from an injection molding including a machine frame supporting a plurality of fixed and movable mold platens supporting at least a single cavity mold wherein the mold opens and closes in cyclic and continuous fashion embracing certain principles of the present invention may comprise rigid boom means mounted to the machine frame or to one of said platens, product retrieval means mounted movably upon said boom means and means for reciprocating said product retrieval means to and from along said boom means relative to said mold in synchronism with a mold cycle whereby said retrieval means moves in a first direction in anticipation of an open mold for product retrieval and in a second direction in anticipation of a closed mold.

Other features and advantages of the present invention will become more apparent from an examination of the succeeding specifications when read in conjunction with the appended drawings, in which;

BRIEF DESCRIPTION OF THE DRAWINGS

FIG. 3 is a top plan view of the illustration of FIG. 2.

FIG. 4 is a view of the left end of FIG. 2.

FIG. 7 is a chart of robot performance, and;

DETAILED DESCRIPTION OF THE PREFERRED EMBODIMENT

Figure 1:
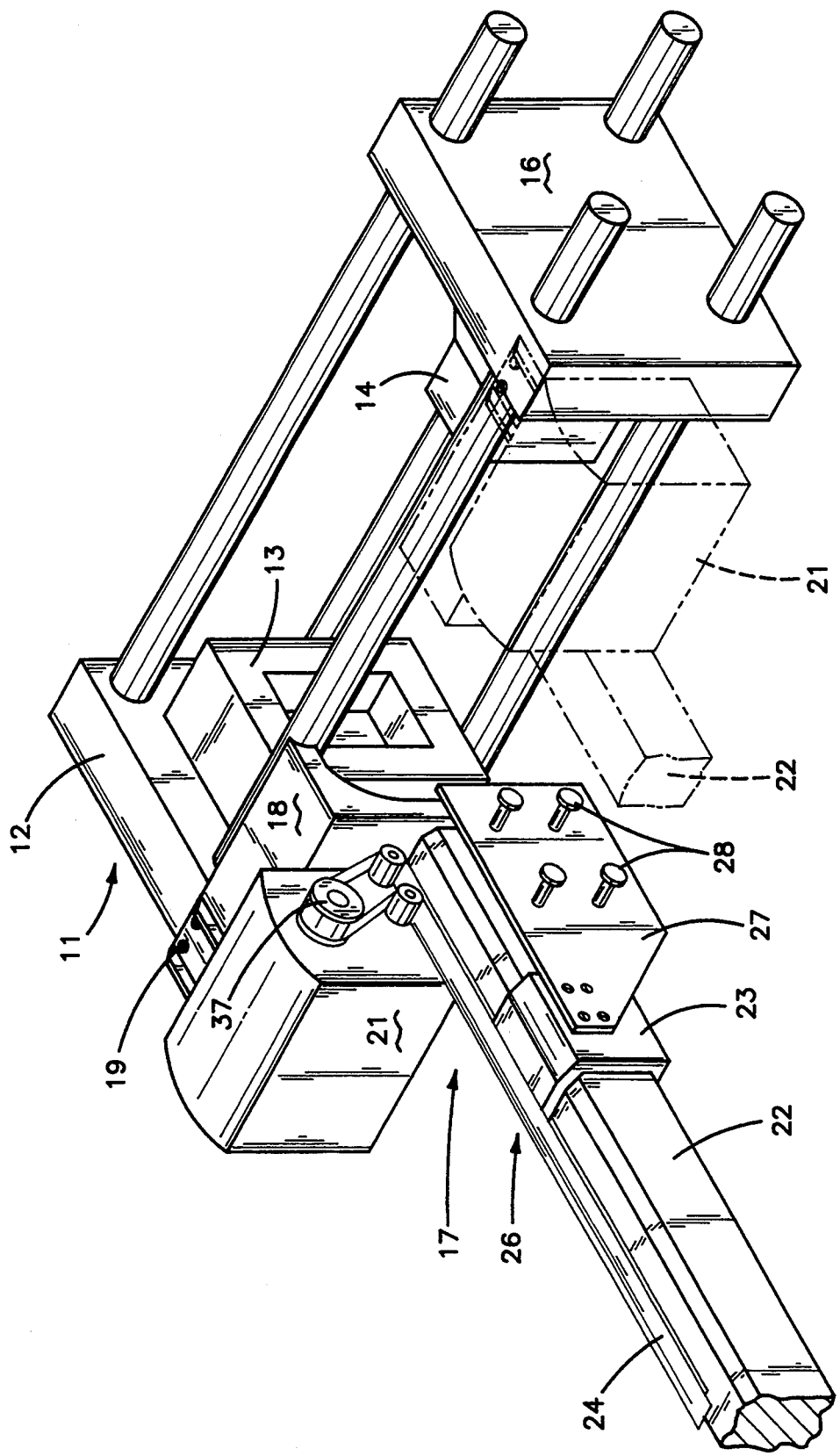
FIG. 1 is a perspective view of a portion of an injection molding machine showing the product retrieval unit connected to a stationary platen.

Referring now in detail to the drawings, in particular to FIG. 1, the reference numeral 11 designates an injection molding machine having a fixed platen 12 supporting a mold half 13 which cooperates with mating mold half 14 carried by movable platen 16.

A product retrieval unit or robot, indicated generally by the reference numeral 17, is secured to platen 12 by means of bracket 18 secured in place by studs 19.

The robot or product retrieval unit 17, as an assembly, includes power means 21 in the form of a servo motor (reversible) with drive pulley 37 secured to bracket 18, trolley means or carriage 23 encircling a boom means 22 driven by the belt means 24 whose ends 39 are connected to the trolley as at 26. Obviously the belt means could be continuous as engineering considerations dictate.

The trolley means 23 supports a pick up plate 27 fitted with a plurality of vacuum cups 28 for grasping molded product in well known fashion.

The structure in dashed lines in FIG. 1 represents the situation wherein the robot unit 17 is mounted to a movable platen such as the movable platen 16.

Figure 2:
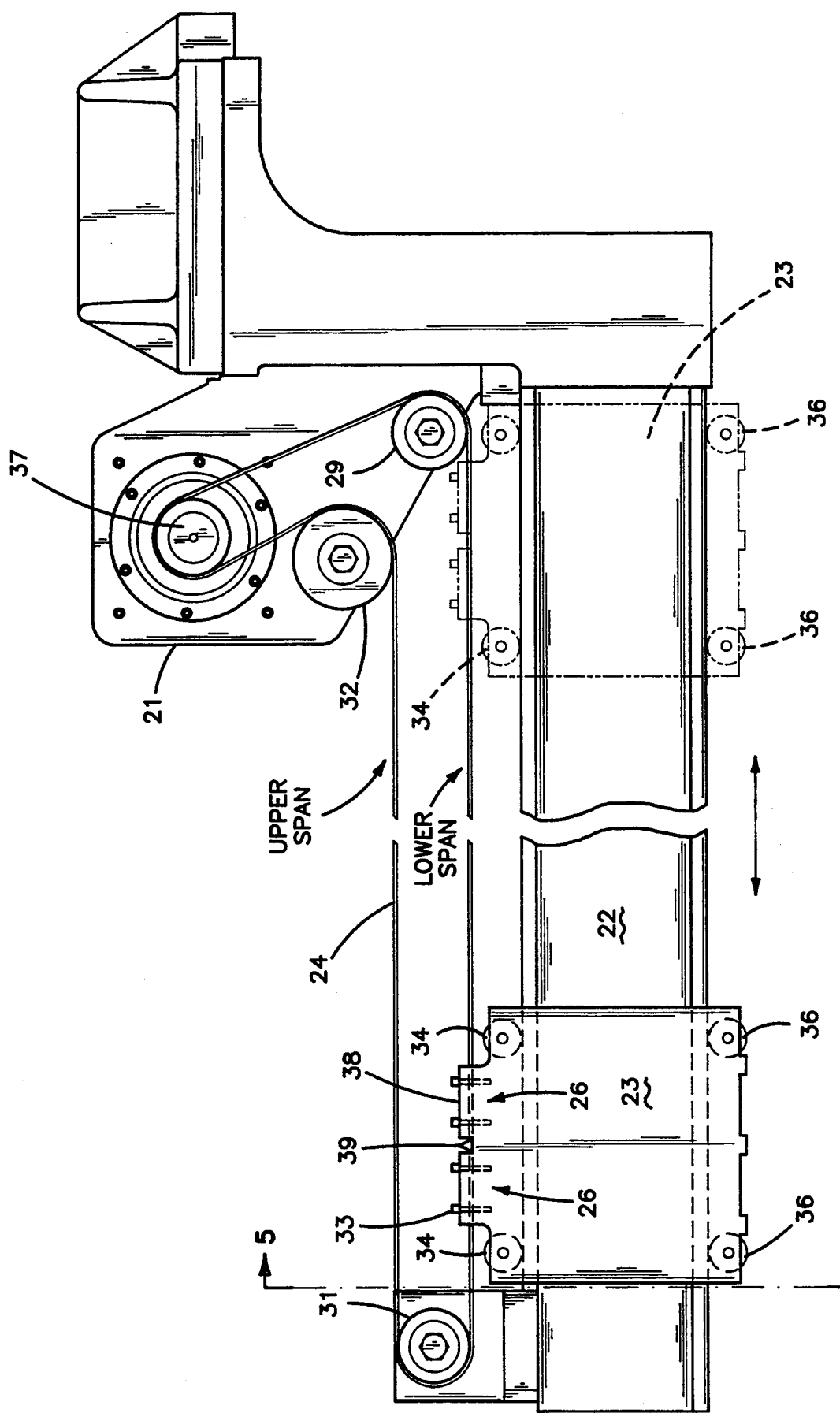
FIG. 2 is a side view of the boom and trolley assembly including its power means.
Figure 6:
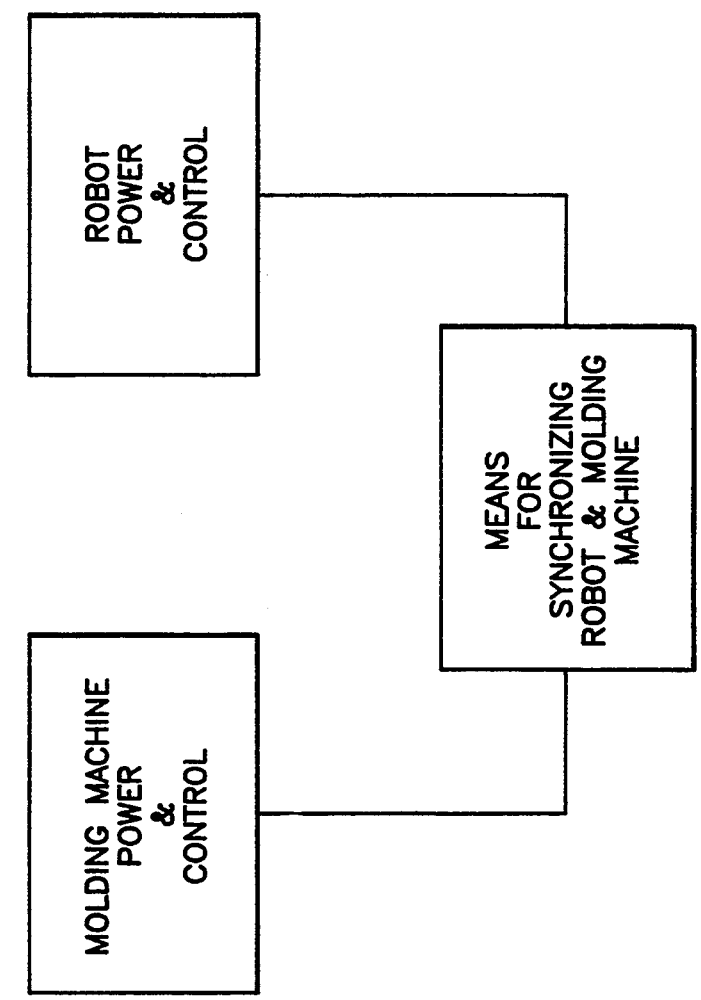
FIG. 6 is a schematic block diagram of the power and control means for operating and synchronizing the molding machine and the trolley means.

As is more apparent in FIG. 2 belt 24 driven by servo motor drive pulley 37, encircles spaced pulleys 29 and 31 fixed to power means 21 and to boom 22, respectively and engages tensioning pulley 32.

The trolley means or carriage 23 is secured to the belt at 26 by means of fasteners 33 and plates 38.

Figure 5:
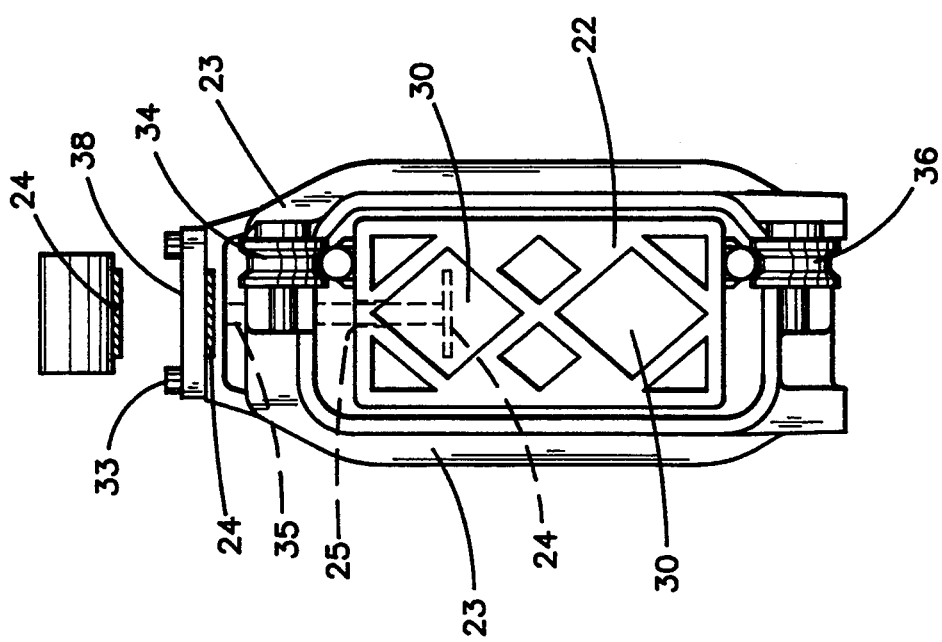
FIG. 5 is a sectional view of the trolley means in the plane of the line 5—5 of FIG. 2 as viewed in the direction of the arrows.
Figure 8:
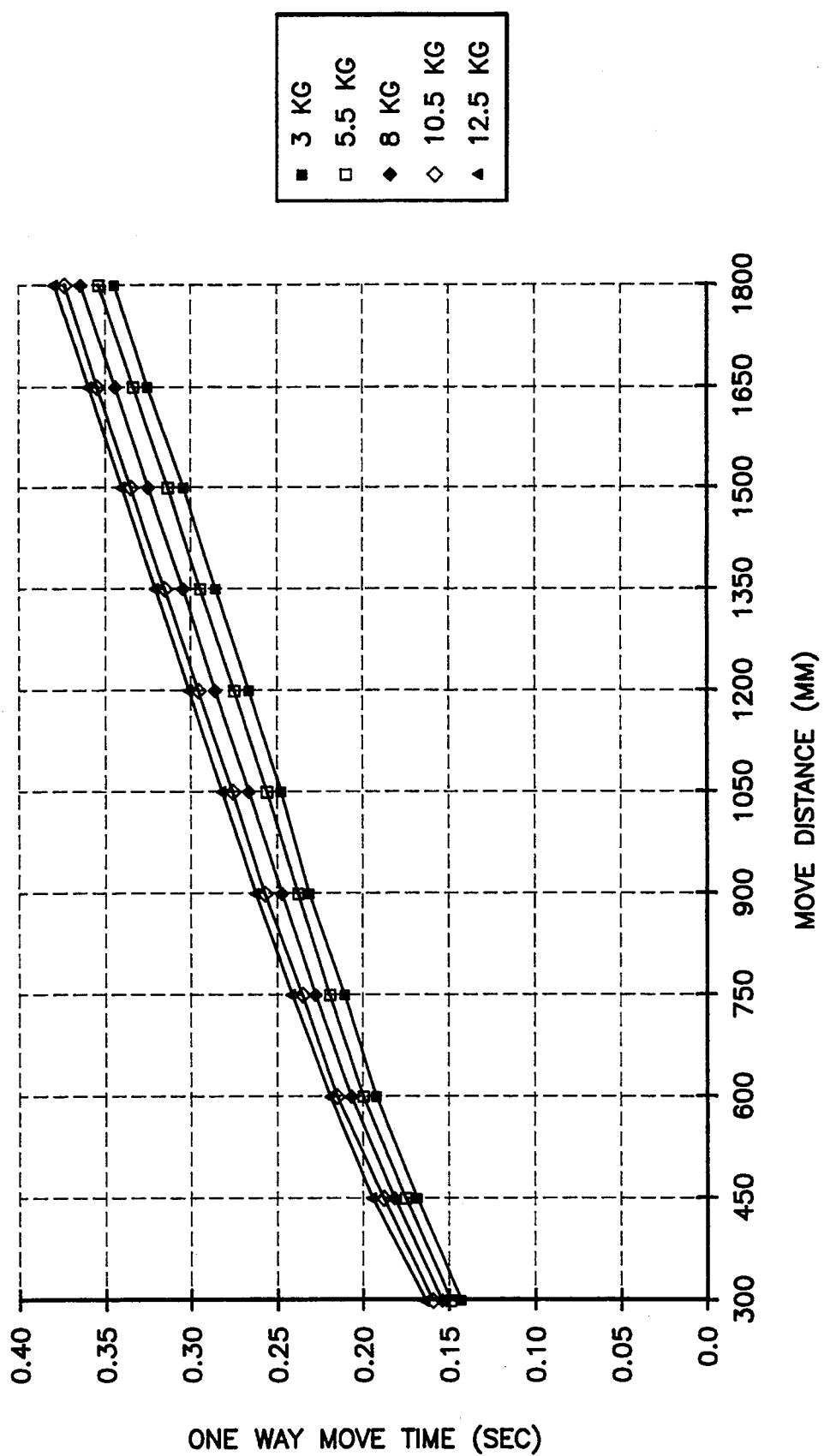
FIG. 8 is a graph of payload performance with a carriage of 9 kg.

The trolley supported and guided by rollers 34 at the top and rollers 36 at the bottom, encircles the boom 22, as shown in FIGS. 1 and 5, and reciprocates from the solid line position of FIG. 2 to the dashed line position thereof as the pick up plate (not shown in FIG. 2) moves into and out of the mold areas for pick up and retrieval of molded product.

As is apparent in FIG. 5 the interior of the boom 22 is formed with a plurality of voids 30 to reduce weight and to provide access for vacuum conduits servicing cups 28 on the pick up plate 27 and for a lower span of the belt means, if desired.

It is to be understood that the operation and structure of the pick up plate need not be limited to vacuum cups. The principles of the present invention are satisfied so long as the boom and trolley structure are light weight and provide the vehicle for introducing a pick up plate into and out of the mold area in synchronism with the operation of the molding cycle.

It is anticipated that a wide variety of embodiments of the present invention can by devised without departing from the spirit and scope thereof.

For example, the belt means can be routed internally of the boom means as shown in dashed lines in FIG. 5 wherein the lower span of the belt 24 traverses a void 30 and a guide slot 25 provides clearance for belt connector 35.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A high speed light weight, retrieval device or robot for unloading molded product from an injection molding machine including a machine frame supporting a plurality of fixed and movable mold platens supporting at least one mold means wherein the mold opens and closes in cyclic and continuous fashion comprising:

boom means defining a single elongated piecepart having opposed sides mounted rigidly to one of said platens, trolley means carried by said boom means, said trolley means defining a single composite piecepart, said trolley means including at least two rollers which straddle said boom means and engage said opposed sides of said boom means whereby said boom means is the sole support and sole guide for said trolley means, product pick up means carried by said trolley means operable independently of said boom means, belt means connected directly to said trolley means for actuating said trolley means, and power means including a reversible servo motor for driving said belt means and thus said trolley means to and fro in synchronism with the cyclic and continuous operation of said at least one mold means.

2. The device of claim 1 wherein the boom means is mounted to a fixed platen.

3. The device of claim 1 wherein the boom means is mounted to a movable platen.

4. The device of claim 1 wherein the trolley means encircles the boom means at least partially.

5. The device of claim 1 wherein the trolley means includes a plurality of pairs of rollers which engage and traverse said boom means on said opposed sides.

6. The device of claim 5 wherein the trolley means encircles the boom means completely and includes opposed pairs of spaced rollers which engage and straddle the boom means.

7. The device of claim 1 wherein the belt means is endless.

8. The device of claim 1 wherein the boom means includes an interior void and the belt means includes an upper span and a lower span and the lower span is routed through the interior void of the boom means.

9. The device of claim 1 including connecting means for attaching the trolley means to the belt means.

10. The device of claim 1 wherein the belt means is generally coextensive with said boom means and is supported by first and second pulleys positioned at opposed ends of said boom means.

11. The device of claim 10 wherein the power means includes a third pulley for engaging and driving the belt means.

12. The device of claim 1 wherein the retrieval device includes a fourth pulley for tensioning the belt means.

13. The device of claim 1 including means for synchronizing operation of the retrieval device with operation of the injection molding machine.

14. The device of claim 1 wherein the trolley means is fabricated from materials selected from the group consisting of aluminum, titanium, magnesium, plastics or compositions thereof to reduce mass.

15. The device of claim 1 wherein the boom means projects laterally and is disposed generally perpendicular to the machine frame.

16. The device of claim 1 wherein the boom means is disposed generally parallel to the horizontal.

17. The device of claim 1 wherein the boom means is fabricated from materials selected from the group consisting of aluminum, titanium, magnesium, alloys thereof, plastics, fiberglass reinforced plastics or composites of plastic.

18. The device of claim 1 wherein the trolley means encircles the boom means completely and carries a payload ranging from 1 kg to 15 kg.

19. The device of claim 18 wherein the trolley means is fabricated from materials selected from the group consisting of aluminum, titanium, magnesium, alloys thereof, plastics, fiberglass reinforced plastics or composites of plastics and said metals and the weight of said trolley means ranges from 8 to 10 kg.

* * * * *